United States Patent [19]

Mabey

[11] Patent Number: 4,913,381

[45] Date of Patent: Apr. 3, 1990

[54] AERODYNAMIC COMPONENTS HAVING LEADING EDGE DEVICES

[75] Inventor: Dennis G. Mabey, Bedford, England

[73] Assignee: The Secretary of State for Defence in her Britannic Majesty's Government of the United Kingdom of Great Britain and Northern Ireland, London, England

[21] Appl. No.: 299,942

[22] PCT Filed: May 12, 1987

[86] PCT No.: PCT/GB87/00320

§ 371 Date: Jan. 12, 1989

§ 102(e) Date: Jan. 12, 1989

[87] PCT Pub. No.: WO87/06908

PCT Pub. Date: Nov. 19, 1987

[30] Foreign Application Priority Data

May 12, 1986 [GB] United Kingdom ............... 8611502

[51] Int. Cl.$^4$ ............................................. B64C 23/06
[52] U.S. Cl. ........................................ 244/199; 244/200; 416/235
[58] Field of Search .............. 244/198, 199, 200, 204, 244/201, 130; 416/235-237

[56] References Cited

U.S. PATENT DOCUMENTS

| 978,677 | 12/1910 | Taylor | 416/236 A |
|---|---|---|---|
| 2,426,334 | 8/1947 | Banning, Jr. | 244/200 |
| 2,800,291 | 7/1957 | Stephens | 244/200 |
| 3,463,418 | 8/1969 | Miksch | 244/199 |
| 3,578,264 | 5/1971 | Kuethe | 244/199 |
| 3,741,285 | 6/1973 | Kuethe | |
| 3,776,363 | 12/1973 | Kuethe | 244/199 |

FOREIGN PATENT DOCUMENTS

| 434778 | 12/1924 | Fed. Rep. of Germany . |
| 2012571 | 3/1970 | France . |
| 479694 | 4/1953 | Italy . |
| 789883 | 8/1955 | United Kingdom . |
| 1281899 | 9/1969 | United Kingdom . |

OTHER PUBLICATIONS

UK Search Report.
Mechanical Engineering, vol. 103, Mar. 1981, (New York, U.S.), "Grooves Reduce Aircraft Drag", p. 71.

*Primary Examiner*—Galen Barefoot
*Attorney, Agent, or Firm*—Nixon & Vanderhye

[57] ABSTRACT

In modern thin wing aircraft flow separation at high incidence may originate at the leading edge. This invention combats the problem by restricting the growth of the region of separated flow by re-energizing the boundary flow downstream of reattachment line (7). It utilizes upper surface grooves (8 and 9) extending rearwardly from the leading edge (5) of the wing. The grooves (8 and 9) have a width at opening in the range 0.05 to 1.0 percent of the aerofoil span and length in the range 1 to 20 percent of the local chord length. Spanwise flow across the grooves causes vortex formation which produces the desired effect without significant drag penalty. In swept wings the grooves are parallel to chord. In straight or forward swept wings the grooves are inclined. The wing includes several grooves each acting as a barrier to growth of flow separation until swallowed within the separated flow.

16 Claims, 5 Drawing Sheets

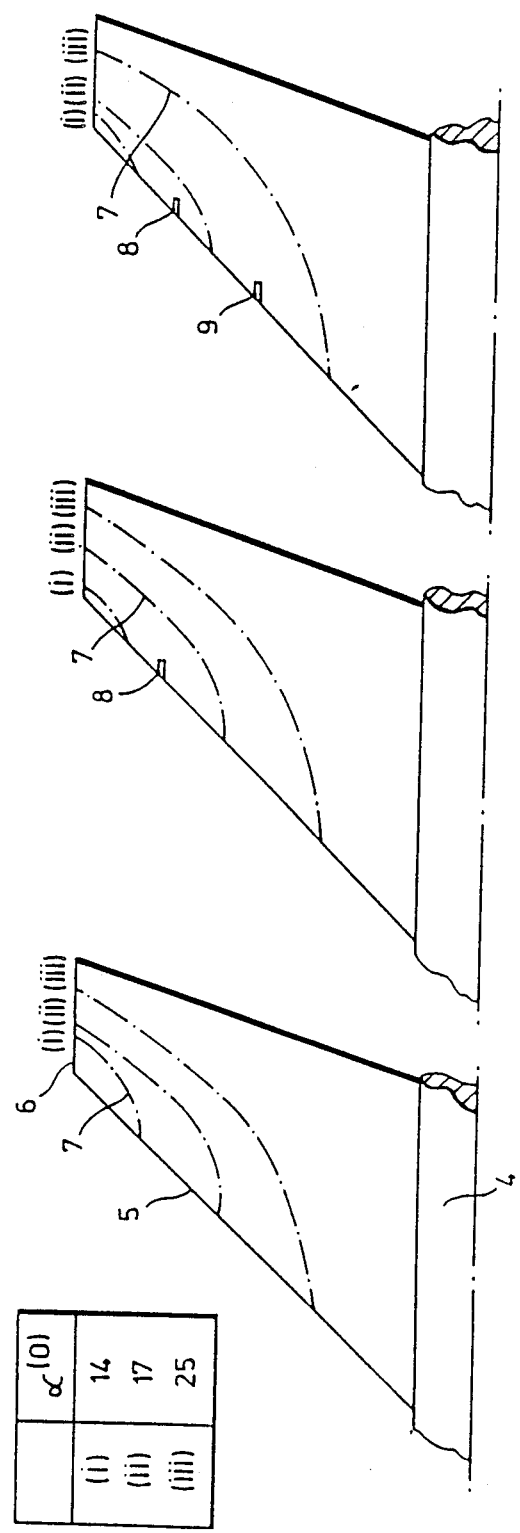

AERODYNAMIC COMPONENTS HAVING LEADING EDGE DEVICES

This invention relates to aerodynamic components having leading edge devices for the improvement of performance at subsonic airspeeds.

The term "aerodynamic component" is used herein to encompass structures having an aerofoil section and significant span. This term is intended to include aircraft wings, fins, tailplanes, canards, engine components such as turbine and compressor blades, propeller blades, helicopter rotor blades, and similar items.

Aerodynamic components such as aircraft wings are subject to flow detachment at high angles of attack. Severe flow detachment causes loss of lift and consequent stall. In many aerodynamic components such as the relatively thin wings found on many modern civil and military aircraft the flow detachment originates at the leading edge of the aerofoil section and expands both rearwardly and in a spanwise direction as the angle of attack is increased. This invention is concerned with inhibiting the growth of leading edge flow detachment on such aerodynamic components. The invention will not be effective in aerodynamic components for which flow detachment originates at the trailing edge.

It is known that in aircraft having wings of conventional rearward sweep that flow detachment can originate at the tip of the wing at its leading edge and can progress both inwardly and rearwardly with respect to the wing as the angle of attack is increased. The flow detachment causes undesirable wing movement known as buffeting and severe detachment leads to stall. There are already a number of different wing modifications which have been introduced to either delay the onset of flow detachment or to inhibit the spanwise growth of the area of detached flow to give improved performance at higher angles of attack. Known devices include leading edge saw tooths notches and fences and upper surface vortilons. Such known devices have undesirable side effects, particularly at higher speeds eg supersonic speeds, such as increased buffet excitation and considerable drag penalty.

It is an object of this invention to offer a modified construction for aerodynamic components which enables the growth of flow separation originating from the leading edge to be inhibited with much reduced side effects. The invention is especially directed to improving the subsonic performance of wings designed for supersonic flight.

This invention is an aerodynamic component having an aerofoil section and significant span, comprising on its expansion surface at least one groove having a width at opening in the range 0.05-1.0 percent of that span, extending rearwardly from the leading edge of the aerofoil section, and having a length in the range of 1 to 20 percent of the local chord length of the aerofoil section. The above mentioned width range is given with respect to the span of a single component. For an aircraft this is half the total wing span—ignoring fuselage thickness.

Preferably the aerodynamic component includes an array of at least two of said grooves mutually spaced apart along the span.

The grooves are believed to function as vortex generators, vortices being formed by airflow across the groove. In a swept wing design there may be sufficient naturally occurring spanwise flow to generate the desired cross-flow with grooves extending substantially along the local chord of the wing. In an upswept wing design or a design using forward sweep then the naturally occuring spanwise flow might not be sufficient to create the required vortices. For such designs the grooves may be inclined to the local chord in a toe-in or toe-out configuration as best enhances the vortex formation. Each groove is effective in inhibiting flow detachment in the region within the vortex wake of the groove providing that the groove itself remains in the region of attached flow. Consequently in a swept wing design in which flow detachment normally commences at the wing tip leading edge and extends inboard and rearwardly with increased angle of attack, a groove serves to inhibit growth of the zone of detached flow outboard of that groove until that groove is overwhelmed by the detached flow when it no longer generates any useful effect. A spaced array of such grooves provides a multi layer defence against flow detachment each groove providing a useful effect when its outboard neighbour is overwhelmed. The spanwise spacing of the grooves is a matter for optimisation having regard to wing geometry flight envelope and desiderata and interactions between wing and fuselage engine or wing-bourne stores. In a clean wing of 44 degrees sweep a configuration of two leading edge grooves (with the grooves at 0.6 and 0.8 of the semi span) was found to be effective in reducing spread of flow detachment at angles of attack of up to 17 degrees and beyond using groove lengths of 8 and 16 mm on a model wing of local chord.

The invention is described hereunder by reference to the drawings of which:

FIG. 2 shows a plan view of a single swept wing and illustrates the growth of flow detachment with an unmodified wing and two modified wing configurations;

Figure 1:
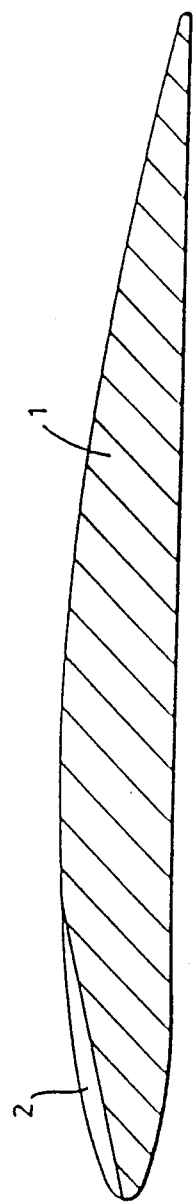
FIG. 1 is a sectional view of a wing showing an upper surface groove.

FIG. 1 depicts a wing 1 having a groove 2 of exemplary form. The groove 2 extends substantially chordwise of the wing 1 (which is of swept configuration) from the foremost point of the local aerofoil section to a position at 10 percent of local chord length over the upper-expansion surface. The groove is of substantially "V" shaped cross section and has a smooth run out to the surface at the rearward limit of the groove so as to avoid any streamwise aerodynamic discontinuity at this point. The leading edge limit to the groove is sited so as to avoid any interference with lower-compression surface flow. The grooved construction can be incorporated easily into wings constructed of fibre reinforced plastics composite material at the lay up stage without detriment to structural integrity which is obviously of paramount importance.

FIGS. 2a–2c illustrate the growth of flow detachment with angle of attack in a swept wing high incidence flow research model. Lines (i), (ii) and (iii) indicate the extent of flow separation occuring on the wing at angles of attack of 14°, 17° and 25° respectively. Forward and outboard of three lines are regions of detached flow. In FIG. 2(a) the area of separated flow for a basic aerofoil wing can be seen. By comparing this with 2(b) the effect on the flow separation of a groove in the upper-expansion surface placed at 0.8 semi span can be seen. This groove reduces the extent of flow separation for angles of attack up to about 14° but has no effect for higher angles. By introducing a further groove at 0.6 semi span as shown in 2(c) the extent of flow separation is reduced for angles of attack up to at least 17°. There is still no reduction in the extent of flow separation for angles of attack in the region of 25° using a two-groove configuration. Provision of further in-board grooves should reduce the area of flow separation at these higher angles of attack.

FIGS. 3–7 illustrate the relative performance of various wing designs with regard to inidividual specified properties. In all these figures the same key to plotted points is used. The datum plain swept wing is plotted using circle marks (o). An identical wing with a single leading edge notch of prior art form is plotted using cross marks (x) the notch being situated at 0.8 semi span, of length 16 mm (2.5 percent local chord) and width 1 mm. An identical wing to the datum with a double grooved configuration is plotted using triangle marks (Δ) this configuration using an upper and a lower surface groove both of length 16 mm at 0.8 semi span. Two identical wings with upper surface groove constructions in accordance with the invention are plotted. The first using a short groove construction is plotted using addition marks (+) the second using a longer groove construction is plotted using diamond marks (◇). Both these constructions use a single groove at 0.8 semi span. The longer uses a groove of 16 mm (2.5 percent local chord) the shorter a groove of 8 mm (1.25 percent local chord).

Figure 3:
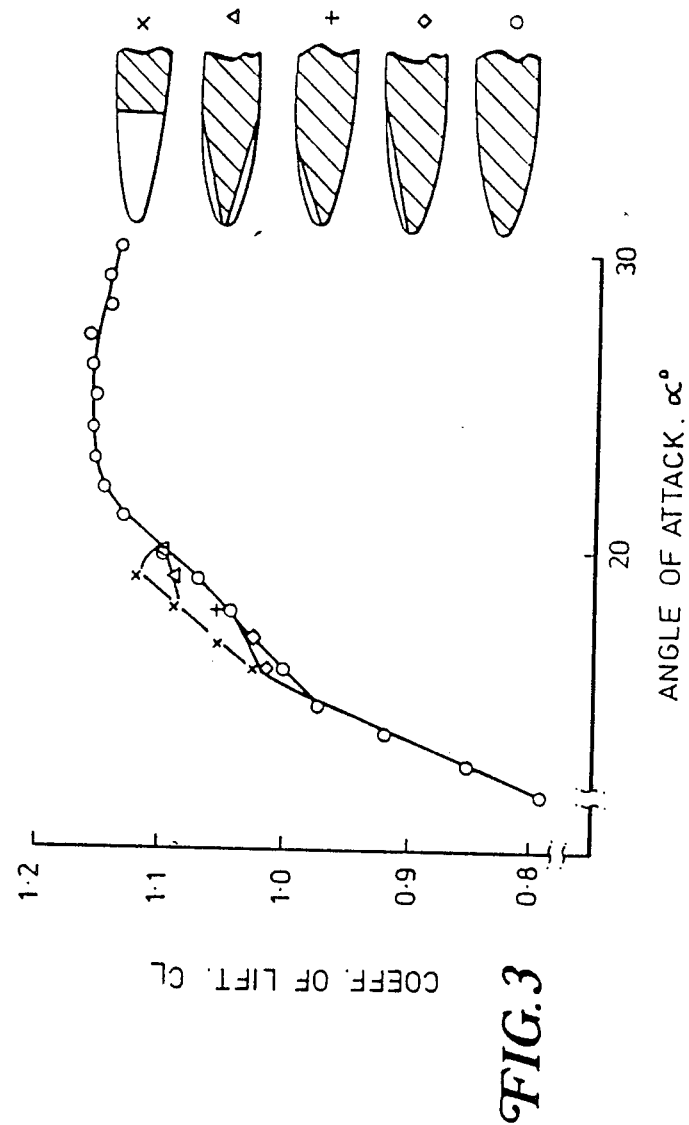
FIG. 3 is a graph of coefficient of lift plotted against angle of attack for two configurations of the invention and three comparative configurations.

FIG. 3 shows that all these modifications are to varying degrees successful in maintaining the coefficient of lift at a higher level than the datum wing with increasing angle of attack up to a common limit of effectiveness at around $\alpha = 17° +$. There is no benefit at higher levels of $\alpha$. From the point of view of better lift/$\alpha$ performance (which is a measure of reduction in flow detachment) the prior art cut-through notch would seem to offer the best performance. It will be seen from FIGS. 4–7 however that while successfully maintaining the coefficient of lift to high angles, the cut-through notch and double groove configurations limit the angle of attack to levels showing little improvement on the datum for other reasons.

Figure 4:
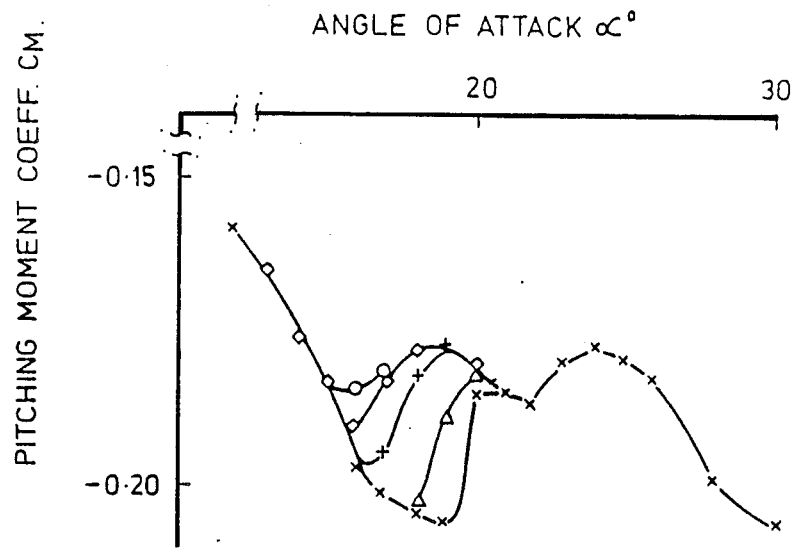
FIG. 4 is a graph of the pitching moment coefficient plotted against angle of attack for two configurations of the invention and three comparative configurations.
Figure 5:
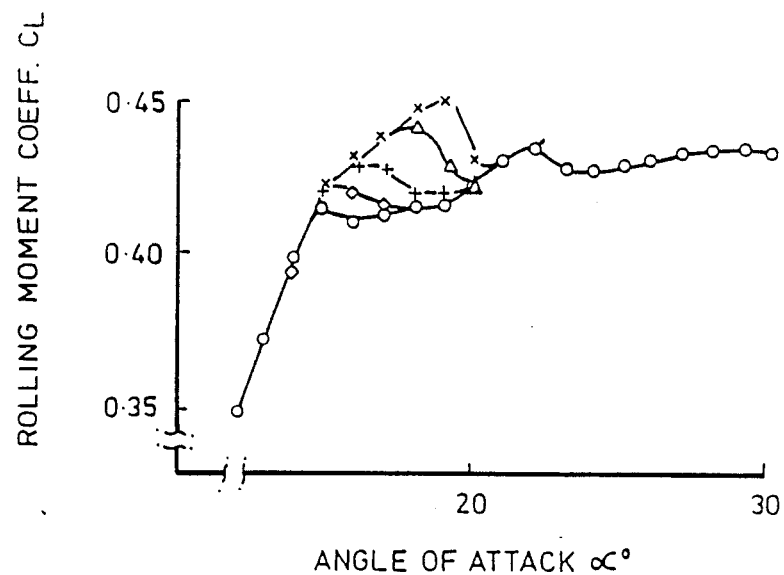
FIG. 5 is a graph of the rolling moment coefficient plotted against angle of attack for two configurations of the invention and three comparative configurations.

FIGS. 4 and 5 show variation in the correlation between both the pitching moment coefficient and angle of attack and the rolling moment coefficient and angle of attack. The variation is particularly sharp for the cut-through notch and double groove configurations. These sharp transitions lead to instability as angle of attack is varied and make control of the aircraft more difficult. The upper surface groove configuration shows a smoother correlation, is more stable, and therefore easier to manipulate.

Figure 6:
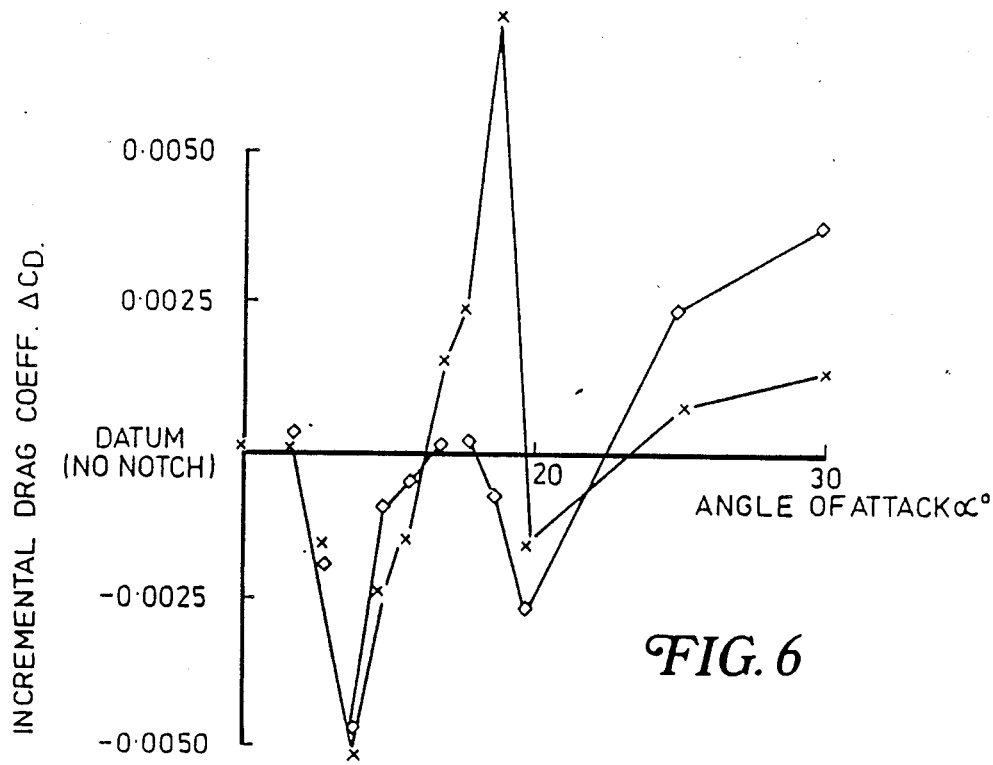
FIG. 6 is a graph of the incremental drag coefficient plotted against angle of attack for one configuration of the invention and two comparative configurations.
Figure 7:
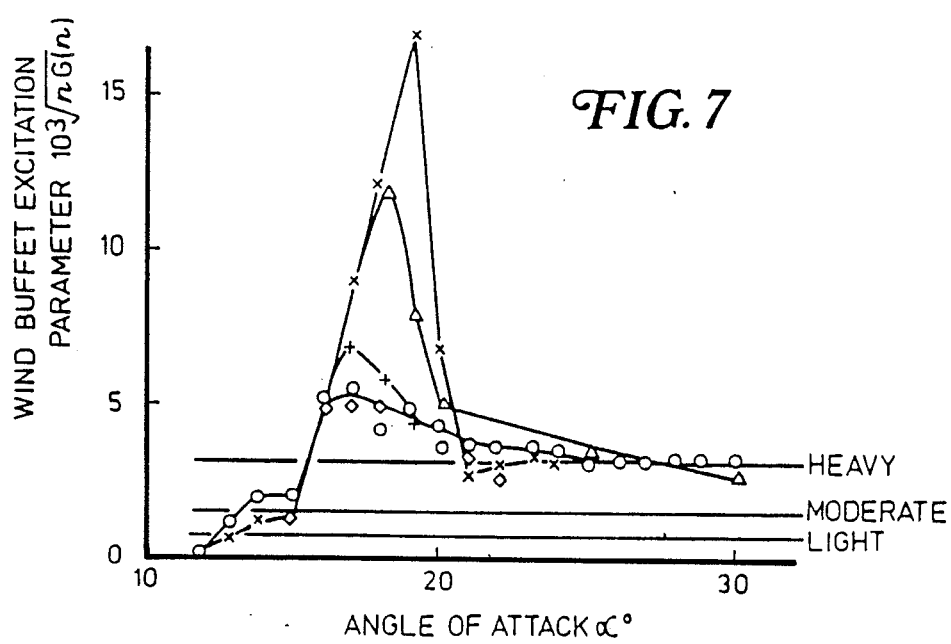
FIG. 7 is a graph of the wing buffet excitation parameter plotted against angle of incidence for two configurations of the invention and three comparative configurations.

FIG. 6 shows the sharp increase in drag, over the datum, experienced by wings having the cut-through notch configuration. This increase becomes significant at angles of attack as low as 16°. In contrast the upper surface groove configuration compares very favourably with the datum for angles of attack up to 22°. A similar pattern is shown in FIG. 7 where the buffet excitation parameter can be seen to increase sharply around 16° for both the cut-through notch and double groove configurations. For the same angles of attack the upper surface groove configurations show significantly smaller peaks and the longer groove is shown to be less susceptible to buffet than the datum.

Figure 8B:
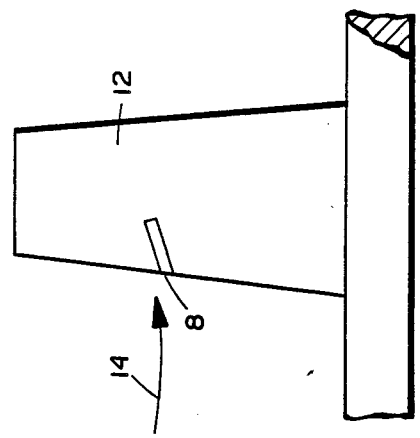
FIGS. 8a and 8b are plan views of swept-forwrad and unswept wings, respectively, incorporating the present invention.
Figure 8A:
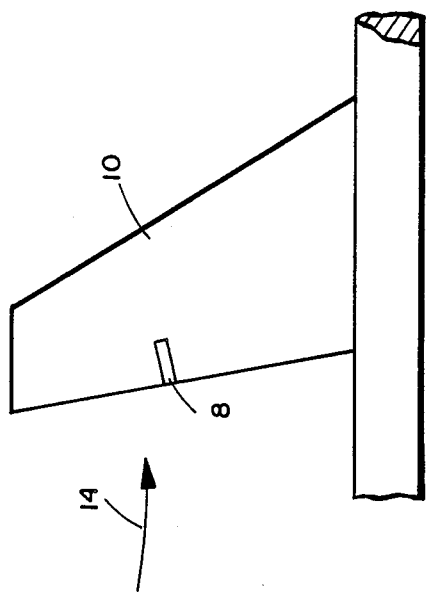

FIGS. 8a and 8b show forward-swept 10 and unswept 12, respectively, plan views of wings with the vortex generating grooves 8 canted with respect to the local airflow shown by arrows 14.

In considering the performance features of an aircraft it is clear that while lift is maintained by the cut-through notch and double groove configurations to angles of attack around 17°, stability, drag and structural considerations limit the practical application of these to lower angles. The upper surface groove configurations, especially the longer groove, maintain lift to slightly lower angles of attack but by reducing the detrimental side effects allow higher angles of attack than previously practicable to be attained.

Tests, not documented in this text, have also been carried out on leading edge fence configurations. These show good maintenance of lift to high angles of attack but incur similar penalties to the cut-through notch configuration in instability, drag and buffet excitation and for this reason are not preferred to the upper surface groove configuration.

A further problem beyond separation induced loss of lift has been experienced with wings highly swept to around 65° at high angles of attack. This is manifest as an uncontrollable spanwise movement of leading edge vortices in a narrow band of the flight envelope which causes control instability due to single degree of freedom flutter. Variable geometry swing wings are particularly prone to this.

It is postulated that the upper surface grooves will mitigate or remove this problem. Groove rather than fence configurations would be better for use on swing wings as they would impose less drag when the sweep adjustment causes misalignment between the airflow and the device.

I claim:
1. An aerodynamic component having an airfoil section said section having a profile and significant span said component having an expansion surface, said expansion surface including at least one groove, said groove comprised solely of a long narrow channel, said at least one groove having a width in the range of 0.05 to 1.0 percent of said span, said at least one groove extending rearwardly from a leading edge of the airfoil section and having a length in the range of 1 to 20 percent of a local chord length of the airfoil section.

2. An aerodynamic component as claimed in claim 1 further including an array of at least two of said grooves mutually spaced apart along the span.

3. An aerodynamic component as claimed in claim 1 which is of swept wing form and said at least one groove is substantially aligned to the local chord of the wing.

4. An aerodynamic component as claimed in claim 1 which is of unswept form and said at least one groove is canted with respect to the local chord of the wing.

5. An aerodynamic component as claimed in claim 2 which is of swept wing form and at least one of said grooves is substantially aligned with respect to the local chord of the wing.

6. An aerodynamic component as claimed in claim 2 which is of unswept form and at least one of said grooves is canted with respect to the local chord of the wing.

7. An aerodynamic component as claimed in claim 1 which is of forward-swept form and said at least one groove is canted with respect to the local chord of the wing.

8. An aerodynamic component as claimed in claim 2 which is of forward-swept form and at least one of said grooves is canted with respect to the local chord of the wing.

9. An aerodynamic component having an aerofoil section and a significant span, said component comprising: a leading edge, an expansion surface extending rearwardly from leading edge and a compression surface extending rearwardly from said leading edge, said component including means for resisting in-board progression of leading edge flow separation, said means comprising at least one groove on said expansion surface, said at least one groove extending rearwardly from a position near said leading edge and lying wholly within a general profile of said expansion surface, wherein said at least one groove conforms to the following dimensional criteria:
   a width near said leading edge, said width in the range of from 0.05 to 1.0 percent of said span; and
   a length in the range of from 1 to 20 percent of a local chord length of said aerofoil section.

10. An aerodynamic component as claimed in claim 9, wherein said aerodynamic component comprises a swept wing and said at least one groove is substantially aligned to a local chord of said wing.

11. An aerodynamic component as claimed in claim 9 which is of unswept wing form wherein said at least one groove is canted with respect to a local chord of said wing.

12. An aerodynamic component as claimed in claim 9 which is of forward-swept wing form wherein said at least one groove is canted with respect to a local chord of said wing.

13. An aerodynamic component having an aerofoil section and a significant span, said component comprising: a leading edge, an expansion surface extending rearwardly from leading edge and a compression surface extending rearwardly from said leading edge, said component including means for resisting in-board progression of leading edge flow separation, said means comprising at least two grooves on said expansion surface, said at least two grooves extending rearwardly from positions near said leading edge and lying wholly within a general profile of said expansion surface, wherein said grooves conform to the following dimensional criteria:
   a width near said leading edge, said width in the range of from 0.05 to 1.0 percent of said span;
   a length in the range of from 1 to 20 percent of a local chord length of said aerofoil section; and
   wherein said grooves are spaced apart, in a spanwise direction, an amount equal to at least 0.05 of said span.

14. An aerodynamic component as claimed in claim 13, wherein said aerodynamic component comprises a swept wing and at least one of said grooves is substantially aligned to a local chord of said wing.

15. An aerodynamic component as claimed in claim 13 which is of unswept wing form wherein at least one of said grooves is canted with respect to a local chord of said wing.

16. An aerodynamic component as claimed in claim 13 which is of forward-swept wing form wherein at least one of said grooves is canted with respect to a local chord of said wing.

* * * * *

UNITED STATES PATENT AND TRADEMARK OFFICE
CERTIFICATE OF CORRECTION

PATENT NO. : 4,913,381

DATED : April 3, 1990

INVENTOR(S) : Dennis G. MABEY

It is certified that error appears in the above-identified patent and that said Letters Patent is hereby corrected as shown below:

Column 2, line 1, "upswept" should read --unswept--.

Signed and Sealed this

Twenty-eighth Day of May, 1991

Attest:

Attesting Officer

HARRY F. MANBECK, JR.

Commissioner of Patents and Trademarks